United States Patent [19]

Cook

[11] 4,098,020
[45] Jul. 4, 1978

[54] METHOD AND APPARATUS FOR HORTICULTURAL GRAFTING

[76] Inventor: Edward J. Cook, 12 Patton Dr., South Hamilton, Mass. 01982

[21] Appl. No.: 781,554

[22] Filed: Mar. 28, 1977

Related U.S. Application Data

[63] Continuation-in-part of Ser. No. 653,465, Jan. 29, 1976, Pat. No. 4,014,132.

[51] Int. Cl.[2] .............................................. A01G 1/06
[52] U.S. Cl. ................................................ 47/6; 30/241; 81/128; 83/513; 83/623; 144/309 L
[58] Field of Search ............... 47/6; 30/241, 242, 243, 30/299; 81/128, 181; 83/513, 623; 144/216, 217, 309 L

[56] References Cited

U.S. PATENT DOCUMENTS

| 340,700 | 4/1886 | Congar | 47/6 |
|---|---|---|---|
| 351,879 | 11/1886 | Maynard | 47/6 |
| 644,059 | 2/1900 | Chevreton et al. | 47/6 |
| 655,422 | 8/1900 | Tyler | 144/217 |
| 1,023,038 | 4/1912 | Robertson | 47/6 |
| 2,219,654 | 10/1940 | Fata | 47/6 |
| 2,580,247 | 12/1951 | Secondi et al. | 81/128 X |
| 3,680,255 | 8/1972 | Grigorov | 47/6 |
| 3,969,843 | 7/1976 | Wahler et al. | 47/6 |
| 4,014,132 | 3/1977 | Cook | 47/6 |

FOREIGN PATENT DOCUMENTS

| 58,881 | 12/1912 | Austria | 47/6 |
|---|---|---|---|
| 398,070 | 5/1909 | France | 47/6 |
| 526,612 | 10/1921 | France | 47/6 |
| 657,056 | 5/1929 | France | 47/6 |
| 124,191 | 1/1900 | Fed. Rep. of Germany | 47/6 |
| 107,707 | 1/1900 | Fed. Rep. of Germany | 47/6 |
| 22,327 of | 1900 | United Kingdom | 47/6 |
| 4,173 of | 1899 | United Kingdom | 47/6 |

*Primary Examiner*—Edgar S. Burr
*Assistant Examiner*—James R. Feyrer
*Attorney, Agent, or Firm*—Morse, Altman, Oates & Bello

[57] ABSTRACT

A method and apparatus are disclosed for making improved grafting joints between plant components, particularly woody plants. Selected plant materials may be grafted one upon another by cutting out two diametrically opposed, longitudinally diagonal sectors from each end of the plant parts to be joined. The sectors are of equal length on each plant part and are joined by slipping the sectored end of one plant part into the cooperating sectored end of the other plant part so that the parts interlock. The joint is then enveloped by tape or the like to seal the joint.

Hand tools and semi-automatic machinery are disclosed for sectoring plants in a single operation and include radial cutting elements arranged perpendicularly to one another and adapted to make four simultaneous slits lengthwise and diagonally along the plant simultaneously removing the waste slit sectors.

10 Claims, 12 Drawing Figures

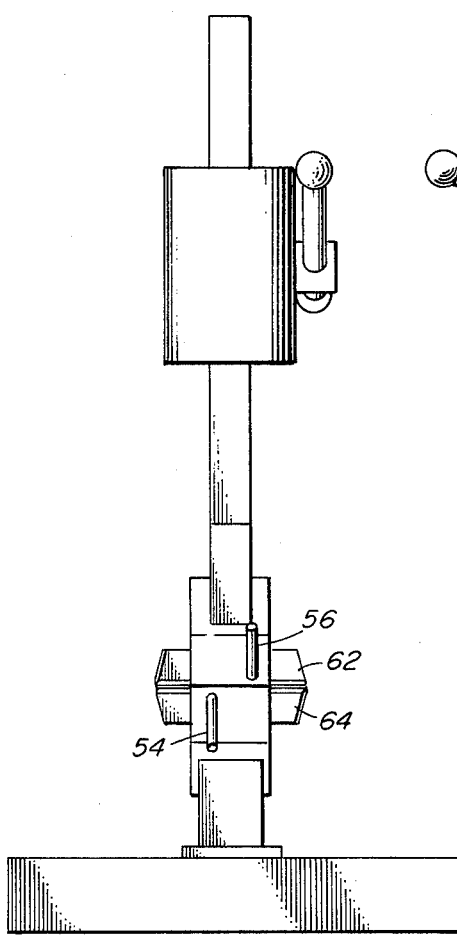
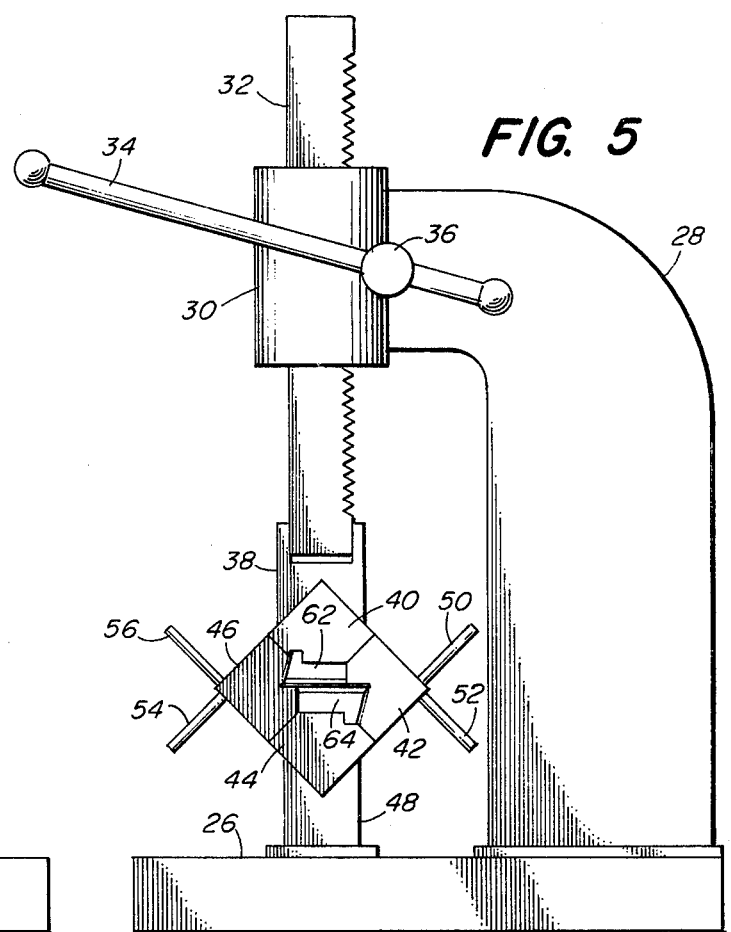
FIG. 6  FIG. 5
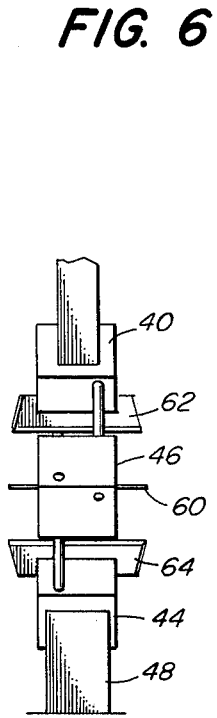
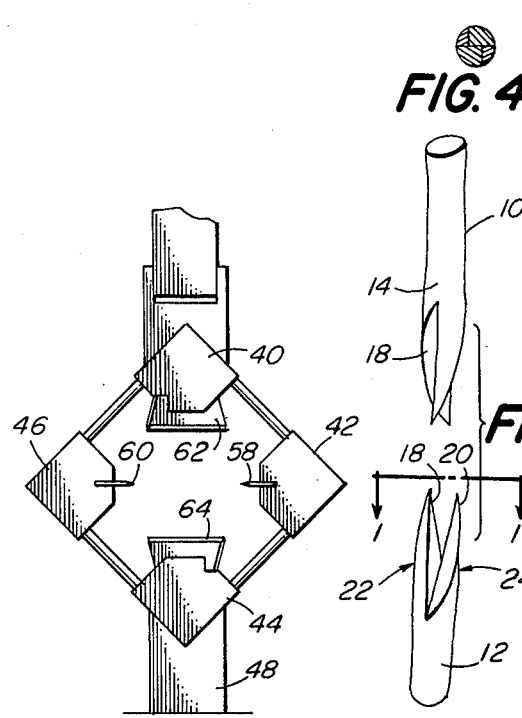
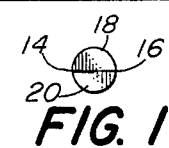
FIG. 4  FIG. 1
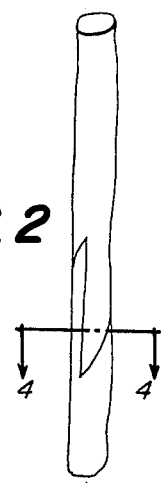
FIG. 2
FIG. 3
FIG. 8  FIG. 7

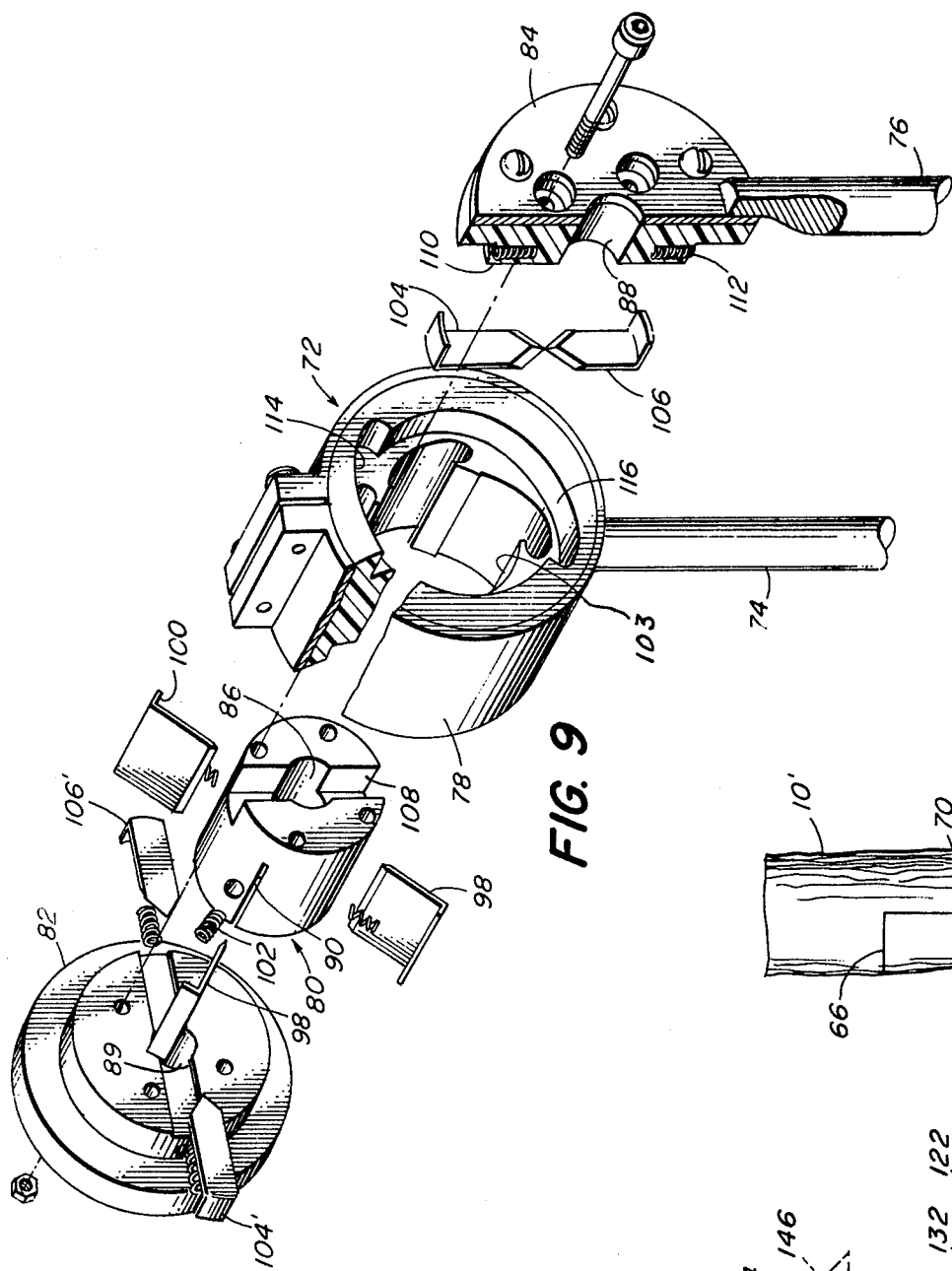
FIG. 9
FIG. 10
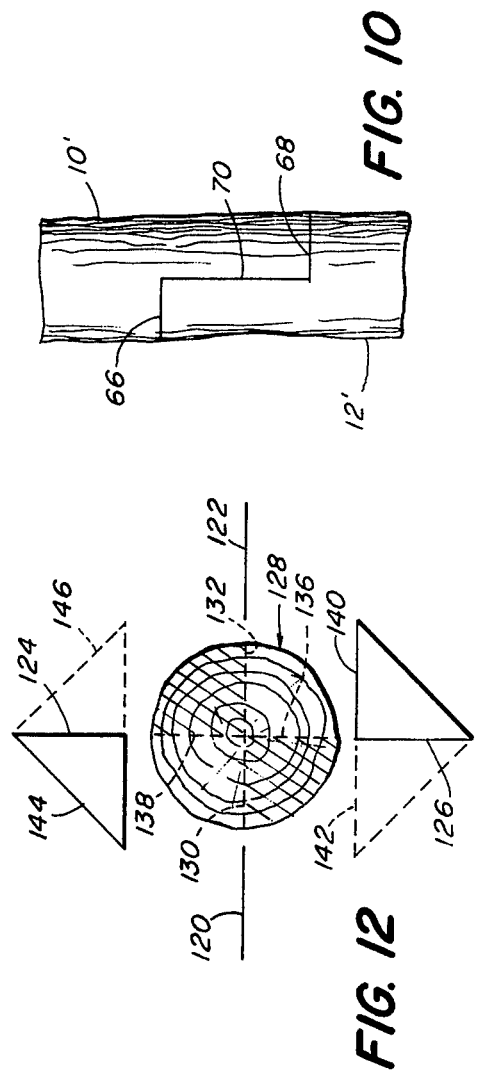
FIG. 11
FIG. 12

4,098,020

METHOD AND APPARATUS FOR HORTICULTURAL GRAFTING

CROSS-REFERENCE TO RELATED APPLICATION

This is a continuation-in-part of U.S. application Ser. No. 653,465, filed Jan. 29, 1976, entitled "Method and Apparatus for Horticultural Grafting", now U.S. Pat. No. 4,014,132.

BACKGROUND OF THE INVENTION

1. Field of the Invention

This invention relates generally to horticultural grafting and is more particularly directed toward a new and improved method and apparatus for making improved graft joints between plant parts, particularly woody plants.

2. Description of the Prior Art

The grafting of a scion upon a rootstock is a common horticultural practice used in the propagation of woody plants. The technique is used widely in the propagation of fruit tree varieties, since bench grafting may be performed during the dormant season of the plant as opposed to field budding during the growing season. Grafting provides the opportunity to build not only the conventional rootstock/scion tree, but also allows for a more complex interstem tree which may have as many as four selected plant materials grafted in series, one upon the other.

In order to graft successfully one plant component to another, it is necessary that the cambium layers of the joined components be in direct contact with one another and that the union be physically strong. The most common technique for grafting woody plant components is by way of a whip graft in which the end of each plant component is cut diagonally at approximately the same angle with a counter-slit made medially and lengthwise through the diagonal cut to form a tongue. The components are then joined so that the tongues are interlocked and the joint is then wrapped by twine or the like. While the whip graft is relatively simple in principle, it requires considerable skill in preparation in order to insure good cambium contact. Further, the strength of the union parallel to the tongue slit is not consistently good and such grafts normally must be tightly wrapped to provide stability.

Accordingly, it is an object of the present invention to provide improvements in grafting techniques. Another object of the invention is to provide a grafting method adapted to produce a structurally strong grafting joint characterized by good cambium contact. A further object of this invention is to provide apparatus to carry out the improved grafting methods on a uniform, highly-repeatable basis.

SUMMARY OF THE INVENTION

This invention features the method of grafting a plant component to another plant component of substantially corresponding diameter, comprising the steps of removing a pair of longitudinal, diametrically opposed diagonal sectors from the end of each part to be joined, joining the sectored ends and then wrapping the ends.

Apparatus for cutting out the sectors for the grafting operation includes four radially arrayed movable cutting elements positioned at 90° angles, two of which are disposed diagonally and have their cutting edges arrayed about a centerline whereby a branch stem placed in the centerline will be slit longitudinally and diagonally in one stroke by movement of the elements, simultaneously trimming away the opposing sectors.

BRIEF DESCRIPTION OF THE DRAWINGS

FIG. 1 is an end view of a woody plant section that has been prepared according to the invention, FIG. 2 is a view in perspective showing opposing ends of plant sections, sectored and ready for joining, FIG. 3 is a view in perspective of plant components that have been grafted according to the invention, FIG. 4 is a cross-sectional view taken along the line 4—4 of FIG. 3, FIG. 5 is a view in side elevation of an apparatus for use in performing the grafting operation of this invention, FIG. 6 is a view in front elevation of the FIG. 5 tool, FIG. 7 is a detail view in side elevation thereof showing the open position of the cutters, FIG. 8 is a detail view in front elevation thereof also showing the open position of the cutters, FIG. 9 is an exploded view in perspective showing a modification of the invention, FIG. 10 is a detail view in front elevation of a joint made by the FIG. 9 device, FIG. 11 is a view in perspective of the assembled hand tool embodiment of FIG. 9, and FIG. 12 is a detail view showing a modification of the FIG. 11 embodiment.

DETAILED DESCRIPTION OF THE PREFERRED EMBODIMENTS

Referring now to the drawings and FIGS. 1 through 4 in particular, there are illustrated the steps of preparing and grafting one plant component to another according to the invention. For purposes of discussion, the process will be described in connection with the grafting of a scion 10 to a rootstock 12 for a woody plant such as a fruit tree, or the like, although obviously the technique is applicable to other grafting situations. Initially a scion 10 is sectored at one end which is to be grafted to the opposing end of the rootstock 12, which is similarly prepared. Since the operations carried on in preparing the rootstock are identical to the preparations carried on in connection with the scion, only one procedure will be described.

As shown in FIGS. 1 through 4, the scion 10 is prepared by making four slits which slits may be made simultaneously. In accordance with the preferred embodiment of the invention, two slits 14 and 16 are made lengthwise of the scion 10 diametrically opposite one another and half-way through the scion so that the scion is slit diametrically in half for a distance of perhaps 1 or 1½ inches when preparing small trees having diameters on the order of perhaps ¼ to ½ inch. For larger sized trees, longer slits may be required. Simultaneously with the longitudinal slits 14 and 16 a pair of diagonal slits 18 and 20 are made. The diagonal slits 18 and 20 are perpendicular to the plane of the longitudinal slits 14 and 16 and at an acute angle with respect to each other, intersecting at the center line of the scion. The longitudinal and diagonal slits result in the removal of two opposite sectors leaving a pair of pointed tongues 22 and 24 extending from the end of the root stock. Each tongue is characterized by a flat face formed by the longitudinal slits 14 and 16 and in the plane thereof. Each tongue also includes a flat face extending diagonally from one side of the scion to the other originating at its inner end near the base of one diametrical slit and extending angularly across the scion terminating at the pointed tip thereof, whereby the diagonal face is somewhat semi-ovoidal in outline with the tip of one tongue disposed in diagonally opposite relation thereof to the other tongue tip. The rootstock is similarly prepared so that the rootstock and scion may be joined in end-to-end relation, each tongue interfitting with the cutaway portion of the other component so that both the rootstock and scion fit neatly together as shown in FIG. 3.

In practice, the scion and the rootstock should be of substantially equal diameter to insure proper fit and proper grafting results. Once the ends are joined together they should be bound in order to seal the joints and to add to the structural stability of the plant until such time as the two parts have grown together. In practice, satisfactory results have been achieved using pressure sensitive adhesive tape, preferably a fabric horticultural grafting tape, which yields a strong joint in all directions but is not subject to the girdling which can result from the use of a hard cord wrap, such as is commonly used in whip grafting operations. Such tape adheres well to a damp surface, prevents drying of the joint and deteriorates after the parts have grown together. The tape is wrapped helically about the joint, fully enclosing it. In lieu of the use of pressure sensitive tape, the joint may also be secured by means of heat shrinkable plastic tubing slipped over the joint and selected in a size that the tubing initially will be larger than the diameter of the plant sections and will, under the application of heat, shrink onto the joined sections to form a tight, sealed joint.

Referring now to FIGS. 5 through 8, there is illustrated an apparatus for use in preparing the sectored ends of the rootstock and scion in performing the grafting operation of FIGS. 1 through 4. The apparatus of the illustrated embodiment is generally organized about a base 26 and a stand 28 secured to the upper face of the base 26 and formed into a semi-arch to terminate in a head 30. The head is formed with a vertical passage through which extends a rack 32 in mesh with a pinion (not shown) rotatably mounted within the head and operated by a lever arm 34 extending from a hub 36 connected to the pinion. By raising or lowering the lever arm 34, the rack 32 may be raised or lowered as desired.

Attached to the lower end of the rack 32 is a saddle 38 which connects to the uppermost of a group of jaws 40, 42, 44 and 46 arranged in a square with the lowermost jaw 44 supported by a block 48. The four jaws are interconnected with one another by means of slide pins 50, 52, 54 and 56, with pin 50 fixed to the jaw 44 and extending slidably through the jaw 42 while the pin 52 is fixed to the jaw 40 and extends slidably through the jaw 42. Similarly, the pin 54 is fixed to the jaw 40 and extends slidably through the jaw 46 while the pin 56 is fixed to the jaw 44 and extends slidably through the jaw 46. The jaw and pin arrangement is such that when the jaw 40 is raised by the rack 32, it will cause the jaws 42 and 46 to move outwardly and upwardly so that the jaws uniformly move apart from one another forming an opening therebetween, as best shown in FIG. 7.

Jaws 42 and 46 each carries a thin, flat, straight cutting element 58 for the jaw 42, and 60 for the jaw 46. Cutting elements 58 and 60 are mounted oppositely one another in the same plane, their cutting edges being parallel and adapted to just meet with one another when the jaws are in a closed position. The cutting elements 58 and 60 are adapted to make the longitudinal slits 14 and 16 in the scion or rootstock during the cutting operation. Jaws 40 and 44 each carries a cutting element 62 for the jaw 40, and 64 for the jaw 44. The cutting elements 62 and 64 are similar to the cutting elements 58 and 60, with the exception that they are arranged diagonally to their respective jaws. The cutting edge of the element 62, while opposite the cutting edge of the element 64, extends in an opposite angle with respect thereto. The cutting edges of both elements 62 and 64 are arranged to meet the opposite sides of the elements 58 and 60 when the jaws are closed. The cutting elements 62 and 64 are provided to make the diagonal slits 18 and 20 simultaneously with the longitudinal slits 14 and 16 when the jaws are closed. Blade sharpness may be extended by plating or coating one of each pair with a relatively soft material such as copper.

The apparatus is used by first raising the rack to open the jaws, inserting one end of the scion or rootstock centrally between the jaws and then moving the lever arm 34 down so as to close the jaws which will make all of the slits in the scion or rootstock simultaneously. The jaws are again opened and the waste material removed. When both the rootstock and the scion have had their ends sectored, as in FIG. 2, they are joined together and bound as in FIG. 3.

While centering the plant part by visual alignment is satisfactory, the positioning of the scion or rootstock centrally in the open jaws may be done mechanically by various types of rests. For example, the rests may take the form of a spring mounted V-notched shelf at either the front, rear, or both of the jaws in which the branch parts may rest. Alternatively, curved leaf springs may extend outwardly from the jaws towards the center line from either side of the jaws to yieldably grip branch parts placed therein.

Referring now to FIGS. 9, 10 and 11, there is illustrated a modification of the invention and in this embodiment means are provided for forming a joint by sectoring the end of the scion and the rootstock in the manner illustrated in the parent application Ser. No. 653,465. In the parent case, the scion and rootstock are joined by sectoring the ends of each part by first trimming each part straight across at a right angle and then forming four mutually perpendicular longitudinal slits along the trimmed end of each part to form four equal longitudinal sectors. A pair of diametrically opposed sectors are then severed at their respective bases and removed from the end of the part. Both sectored ends of the scion and rootstock are trimmed back to the same length, which length should be sufficient to form a good cambium contact with the other part. The slitting and cutting result in removal of two pie-shaped sectors opposite one another for the scion and rootstock so that the ends of the scion and rootstock, once similarly prepared, may be fitted together in end-to-end relation. The joint formed by such sectoring is shown in FIG. 10 with the scion being indicated by reference character 10' and the rootstock indicated by reference character 12'. The first trimming cut at the end of the rootstock is indicated at 66 while the transverse sectoring cut is indicated at 68, with the vertical sectoring cuts indicated at 70. The scion cuts are made similarly and thus the parts are joined together to form the joint shown in FIG. 10.

In FIGS. 9 and 11, there is illustrated a device for performing the several cuts simultaneously for either the scion or the rootstock. The device comprises a head assembly 72 having a pair of radially extending arms 74 and 76 by means of which parts within the head assembly are operated. The head assembly includes a hub 78 in which is mounted a rotatable core 80. An annular end cap 82 closes the back end of the head assembly, while an annular cover plate 84 closes the front end thereof and drivingly connects with the front end of the core 80. The core 80 is formed with an axial passage 86 aligning with an opening 88 in the cover plate 84 and opening 89 in end cap 82 through which one end of either the scion or the rootstock is inserted for trimming. The part is inserted all the way through the opening.

The core 80 is formed with four radial slots 90 arrayed about the center line of the core and at 90° with respect to one another. Each slot 90 carries a slitting element 98 adapted to reciprocate within its respective radial slot and each element is formed with a bent end 100. A compressed coil spring 102 is mounted within a socket adjacent each radial slit and bears against the bent end 100 of each cutting element, urging the cutting element radially outward. The bent end is thus pressed into contact with a cam surface 103 formed on the inner walls of the hub. The hub is formed with several such cam surfaces so that each cutting element is contacted therewith. In one position of the hub, the cutting elements are retracted whereas if the core is rotated with respect to the hub approximately 90°, the cam surface 103 bears against the bent ends of the cutting elements forcing them inwardly where their cutting edges substantially meet at the center line. Thus, when a root or scion is inserted in the device and the handles 74 and 76 actuated, four slits will be made longitudinally of the rootstock or scion.

Simultaneously with the formation of the four longitudinal slits, the sectors made thereby are severed at their bases by transverse cutting elements 104 and 106. These elements are mounted in radial grooves 108 formed in the fore-end of the core. The elements 104 and 106 are held in a groove by means of radial ribs 110 formed in the inner face of the cover plate 84. Each of the ribs is formed with a radial socket which carries a compressed coil spring 112 therein bearing against the bent outer end of each cutting element 104 and 106, forcing them outwardly when the cutting elements 90 are open. The cutting ends of the elements 104 and 106 are formed into right angular points diagonally opposite one another to cut away the pie-shaped sectors, previously described, on opposite sides of the rootstock or scion. The bent outer ends of the elements 104 and 106 bear against the cam surfaces 114 and 116 formed near the front end of the inner walls of the hub 78 and provide the same cooperating action for the cutting elements as do the cam surfaces for the longitudinal slitting elements. Similar cutting elements 104' and 106' are mounted between the rear face of the core and the end cap 82 and oriented 90° with respect to the cutting elements 104 and 106. These rearmost elements serve to trim the outer ends of the plant sectors. The device is used by operating the handles 74 and 76 first to open up the blades of the cutting elements to allow insertion of either the scion or the rootstock. Once in position, the handles are then moved to rotate the cover plate and the core, causing the blades to move radially inwardly to form the longitudinal as well as transverse cuts in the scion or rootstock. The handles are then moved to open the blades and then the sectored plant is removed and ready for joining with a similarly prepared rootstock or scion, as the case may be.

Referring now to FIG. 12, there is illustrated a further modification of the invention, and in this embodiment there is shown a four blade arrangement for slitting, sectoring and trimming a scion or rootstock in a single operation using only four blades. The illustrated arrangement may be used with a device, such as shown in FIGS. 9 and 11, or, by modifying the apparatus of FIGS. 5 through 8, the four elements may also be used. In any event, the arrangement involves the four cutting elements 120, 122, 124 and 126. The elements 120 and 122 are flat and straight and form simple, straight radial slits in a scion 128, for example, located along the center line of the four elements. Cutting element 120 is adapted, when reciprocated into the center line, to make a longitudinal radial slit 130, while the cutting element 122 makes an opposite slit 132 of corresponding length and depth. Cutting elements 124 and 126 are arranged perpendicularly to elements 120 and 122 and include a longitudinal straight section which forms longitudinal radial slits 134 and 136, respectively, and the element also includes offset and cutting portions bent at right angles to the longitudinal portion and shown as triangular pieces 140 and 142 for the element 126. The triangular portion 140 extends to one side from one end of the cutting element while the triangular portion 142 extends oppositely from the other end of the cutting element. Similarly, the element 124 includes triangular sections 144 and 146 offset in opposite directions so that when the elements 124 and 126 reciprocate into the rootstock or scion they form not only the longitudinal slits 136 and 138 but also will cut away a pair of diagonally opposite pie-shaped sectors with the rearmost cutting portions 142 and 146, while the foremost cutting portions 140 and 144 trim away waste stock from the pie-shaped sectors remaining in the rootstock or scion. Thus, when the cut is made, the part is fully sectored and ready for joining with its opposite part.

Having thus described the invention, what I claim and desire to obtain by Letters Patent of the United States is:

1. The method of grafting one plant component to another of similar diameter comprising the steps of
   slitting the end of each component longitudinally substantially along its central axis forming two facing halfs thereby and slitting each half diagonally in a plane perpendicular to the longitudinal slit and oblique to the central axis, each oblique slit extending transversely of the respective half, with the plane of one oblique slit at an angle to and intersecting the plane of the other oblique slit to form four tapered sections on each component,
   (b) removing from the end of each component two resulting diametrically opposite matching tapered sectors to leave two diametrically opposite complementary tapered sectors of substantially equal size at the end of each component,
   (c) said complementary sectors being of substantially equal length and of a thickness at their bases equal to the radius of said components,
   (d) coaxially aligning the facing sectored ends of said components with the ends oriented for sliding, interlocking engagement,
   (e) sliding said ends together, and
   (f) binding the joint formed thereby.

2. The method of claim 1 wherein the end of each component is longitudinally slit along lines located at substantially 180° to one another and diagonally along lines located at substantially right angles to both sides of the longitudinal slit lines to form two substantially equal diametrically opposite tapered sectors.

3. Apparatus for sectoring the end of a plant component for grafting to a similarly sectored end of another plant component, comprising
   (a) a plurality of pairs of jaws arrayed evenly about a center line,
   (b) means mounting said jaws for simultaneous movement to and away from said center line,
   (c) a first cutting element mounted in each of one pair of jaws in diametrically opposed relation and extending longitudinally of said center line,
   (d) a second cutting element mounted in each of another pair of jaws in diametrically opposed relation and extending in intersecting diagonal relation to one another and to said center line, and
   (e) means for moving said jaws between an open to a closed position to form a pair of tapered sectors on the end of a plant component positioned along said center line.

4. Apparatus, according to claim 3, wherein said mounting means includes a plurality of pins each slidably connecting each adjacent pair of jaws, each of said pins disposed in spaced perpendicular relation to said center line and offset from the plane thereof.

5. Apparatus, according to claim 4, wherein each of a pair of opposite jaws is provided with a pair of mutually perpendicular pins fixed thereto and extending therefrom and slidably engaging jaws adjacent thereto.

6. Apparatus, according to claim 5, wherein the first of said pair of jaws is fixed and the second is movable to and away therefrom and reciprocating means engaging said other jaw whereby reciprocation of said second jaw will move other jaws connected thereto to and away from said center line.

7. Apparatus, according to claim 6, wherein said reciprocating means includes a rack connected to said first jaw, a frame proximate to said jaws, a pinion rotatably mounted to said frame and in mesh with said rack and control means connected to said pinion for rotation thereof.

8. Apparatus for sectoring the end of a plant component for grafting to a similarly sectored end of another plant component, comprising
   (a) a first member and an annular second member mounted within said first member and movable with respect thereto,
   (b) at least four mutually perpendicular cutting elements mounted in radial arrangement to said second member for movement to and away from a common center line,
   (c) cam means on said first member engaging said cutting elements and adapted to move said cutting elements to and away from said center line upon relative movement of said first and second members to form longitudinal slits on a plant component located along said center line.

9. Apparatus, according to claim 8, including a pair of transversely mounted cutters at each end of said second member for making diagonally opposite wedge shaped cuts in said component at the ends of said slits.

10. Apparatus, according to claim 8, wherein each of an opposing pair of said elements is formed with a straight center portion and a bent portion at each end thereof, each bent portion being substantially perpendicular to said center portion and extending to a different side thereof.

* * * * *